United States Patent [19]

Lim

[11] Patent Number: 4,703,491
[45] Date of Patent: Oct. 27, 1987

[54] OPTICAL SYSTEM FOR FOLDED CAVITY LASER

[75] Inventor: Gnian C. Lim, Los Angeles, Calif.

[73] Assignee: Amada Engineering & Service Co., Inc., La Mirada, Calif.

[21] Appl. No.: 802,379

[22] Filed: Nov. 27, 1985

[51] Int. Cl.[4] ............................................. H01S 3/081
[52] U.S. Cl. ..................................... 372/93; 372/107
[58] Field of Search ................................... 372/93, 107

[56] References Cited

U.S. PATENT DOCUMENTS 4,300,106 11/1981 Hohl et al. ............................. 372/93

Primary Examiner—James W. Davie
Assistant Examiner—Bertha Randolph
Attorney, Agent, or Firm—Wigman & Cohen

[57] ABSTRACT

An optical system for a folded cavity laser has a partially transmitting output mirror and a fully reflective folding mirror on one side of an active laser medium, and another folding mirror on the other side of the active laser medium disposed so that a resonating laser beam inside the resonator cavity may make multiple passes to obtain a long effective cavity length. Means are provided for adjusting at least one of the folding mirrors so that the laser beam resonates within the cavity. Means are also provided for adjusting the output mirror so that misalignments of the folding mirrors are compensated.

6 Claims, 2 Drawing Figures

OPTICAL SYSTEM FOR FOLDED CAVITY LASER

FIELD OF THE INVENTION

This invention relates to an optical system for a folded cavity laser, in which multiple passes of a resonating laser beam inside a resonator cavity to obtain a long, effective cavity length is achieved by means of two folding mirrors set to face each other and tilted at suitable angles with respect to the output beam axis, and in which a partially transmitting mirror is placed along the beam axis to couple a fraction of the beam power out of the cavity, whereby optimum alignment of such an optical system can be achieved by turning just one of the folding mirrors or the output mirror.

DESCRIPTION OF THE PRIOR ART

Conventional optical arrangements for laser resonators comprise of a rear mirror at one end of the active medium and a partially transmitting output mirror or output coupler at the other end. In order that the laser beam will have a low order spatial mode and still give a reasonably large beam diameter, it is necessary to increase the optical path length of the resonating beam. This is customarily achieved either by separating the rear mirrors and output coupler by a long distance, or having two additional mirrors to fold the resonating beam forward and backward over a number of times, as demonstrated in FIG. 1.

In FIG. 1 the optical cavity of the laser is defined by a fully reflecting end or rear mirror 1 on the left side of an active laser medium 2, a partially transmitting output mirror 3 on the same side and longitudinally displaced from the mirror 1, and fully reflecting mirrors 4, 5 on opposite side of the medium 2 and between the longitudinally spaced end and output mirror 1, 3 respectively.

The tilt angles of the mirrors are adjusted so that the laser beam 6 is reflected several times through the active laser medium 2 before a portion of the beam 7 is coupled through the output mirror 3.

However, there is a common drawback in the above mentioned optical arrangement: in order to obtain an optimum spatial mode, it is necessary to adjust the tilt angles of both the rear mirror and the output coupler at the same time. The tilt angles here are defined as the angles between the output laser beam axis and the plane of the rear mirror or output coupler. Each of the two mirrors thus can be tilted along the X as well as the Y axes, where the X and Y axes are orthogonal to each other as well as to the beam axis. In consequence, there are four parameters required to be adjusted in order to optimize the laser beam profile.

SUMMARY OF THE INVENTION

Therefore, one of the objects of the present invention is to provide an optical system for a folded cavity laser to obtain a long effective beam path.

Another object of the present invention is to provide a technique in which it is only necessary to adjust one of the optical components in order to optimize the laser beam profile.

An added advantage of the present invention is that no rear mirror is required.

Still a further advantage is that computer aided automatic adjustments of the above mentioned optical components to optimize the mode profile can be done more easily, since only two axes must be adjusted, instead of four with a conventional design.

These and other objects are met by an optical system for a folded cavity laser comprising a partially transmitting output mirror and a folding mirror on one side of active laser medium, another folding mirror on the other side of said active laser medium, and means for adjusting at least one of said folding mirrors so that the laser beam resonates within the cavity.

Further objects and advantages of the present invention will be apparent from the following description and accompanying drawing which, by way of illustration, show preferred embodiments of the preset invention and the principle thereof.

DESCRIPTION OF THE PREFERRED EMBODIMENT

Figure 1:
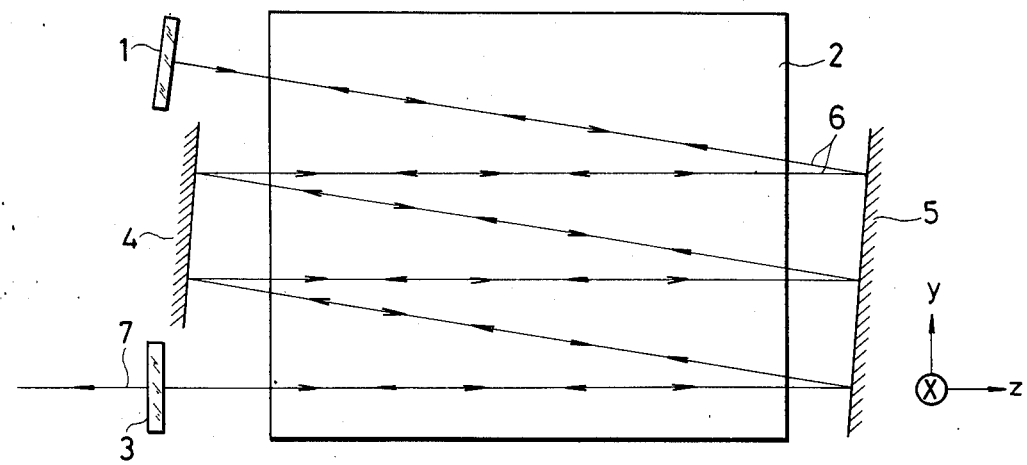
FIG. 1 is a schematic plan view of a conventional optical system for a folded cavity laser having folding mirrors and illustrating the reflections of a laser beam through the active laser medium.
Figure 2:
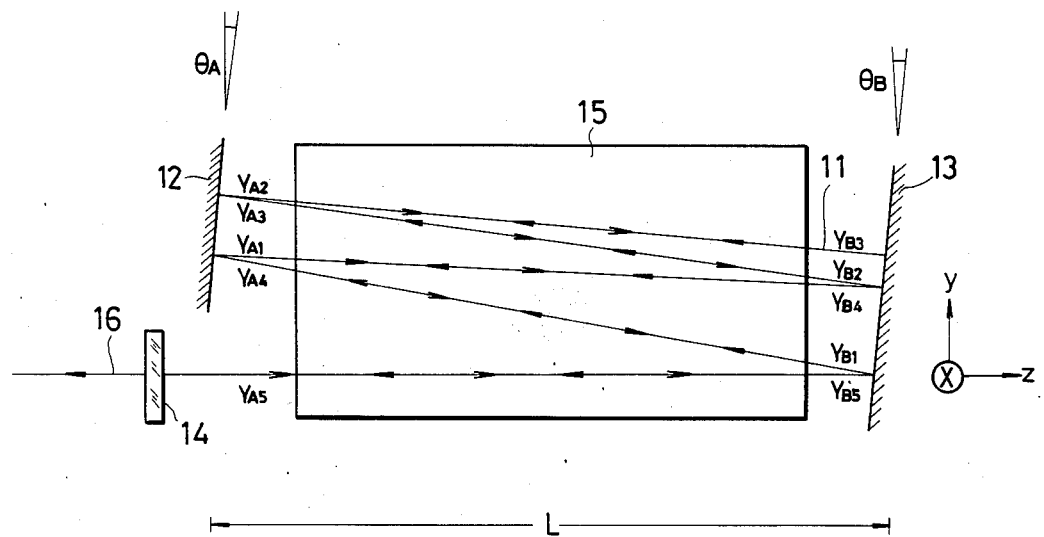
FIG. 2 is a schematic plan view of a laser system for a folded cavity emboding the invention showing tilt angles of the folding mirrors to complete the optical circuit.

Referring to the drawings, FIG. 2 shows a first embodiment of the invention. The resonator beam 1 is folded into a number of passes by folding mirrors 12, 13. The laser beam 16 is coupled out of the resonator through the partially transmitting output mirror 14, which is also described as an output coupler. The active laser medium is indicated by the number 15. The reference axes in FIG. 2 are drawn in such a way that the output laser beam 16 is taken as the Z axis. The Y axis is perpendicular to the Z axis, and is in the plane of the paper. The X axis is perpendicular to both the Z axis and to the plane of the paper. The plane of the output coupler 14 is perpendicular to the Z axis.

The folding mirror 12 is tilted about the X axis by an angle $\theta_A$ with respect to the Y axis.

The other folding mirror 13 is tilted about the X axis by an angle $\theta_B$ with respect to the Y axis.

It is assumed, as is generally true for a practical laser resonator, that both $\theta_A$ and $\theta_B$ are small angles such that $\sin \theta_A \cong \theta_A$ and $\theta_B \cong \theta_B$.

Ray tracing theory shows that a ray incident onto the folding mirror 13 along the Z axis would be reflected alternatively by the two mirrors 13 and 12. The positions where the beam hits mirror 13 are designated as $Y_{B1}, Y_{B2}, \ldots Y_{Bn}$, and those on mirror 12 as $Y_{A1}, Y_{A2}, \ldots Y_{Am}$ where m and n are positive intergers such that $$n - m = 0 \text{ or } 1 \tag{1}$$

These positions are the distances measured from the Z axis and are given by $$Y_{Am} = 2L\theta_B m[m - (m-1)R] \tag{2}$$

and $$Y_{Bn} = 2L\theta_B(n-1)[n - (n-1)R] \tag{3}$$

where L is the distance between mirrors 12 and 13, and $$R = (\theta_A/\theta_B) \tag{4}$$

An example of the positions of $Y_{Am}$ and $Y_{Bn}$ are shown in FIG. 2. The number of laser beam passes N within the resonator is given by $$N = m + n \tag{5}$$

Now, in order to complete the optical circuit, it is necessary to set $$Y_A(m+n) = Y_{AN} = 0 \tag{6}$$

As shown in FIG. 2 wherein N=5, this equation (6) means that the ray 11, which is for example first directed to the point $Y_{B1}$ of the folding mirror 13 is reflected alternatively by the two mirrors 12, 13 at $Y_{B1}$, $Y_{A1}$, $Y_{B2}$, $Y_{A2}$ and reaches to $Y_{B3}$; and after the reflection at the point $Y_{B3}$, the ray 1 returns along the same path as it traces when it advances to the point $Y_{B3}$. The equation (6) also means that the rays hitting the mirror 13 at the points $Y_{B3}$ and hitting the mirror 12 at $Y_{A5}=0$ are vertical to the plane of the mirrors 13 and 12 respectively; therefore the laser beam in the cavity, which is designed so as to satisy equation (6), resonates under optimum conditions.

From equation (2) and (6), it follows that $$R = (N/N - 1) \tag{7}$$

Next, in order to more particularly specify the configuration of the mirrors 12, 13, 14, a design example is explained. The following conditions are required:
1. The mirrors' separation is one meter,
2. The total number of passes is five,
3. The distance of the first laser beam spot on mirror 12 from the Z axis is 0.03 meter.

The first condition requires that L=1 (meter). The second condition requires that N=5, and so from eqs. (1) and (5) we have n=3 and m=2.

Substituting the results n=3 and m=2 into eq. (2), we have $$Y_{A1} = 2 \theta_B.$$

Hence, from the equation $Y_{A1}=2\theta_B$ and the third condition $Y_{A1}=0.03$, it follows that $0.03=2\theta B$, which gives $$\theta_B = 0.015 \text{ radians}$$

From eq. (7), we also have $$R = 1.25$$

and so from eq. (4), we have $$\theta_A = 0.01875 \text{ radians}$$

Hence, the design objectives can be achieved by setting the tilt angles of mirrors 12 and 13 at 0.01875 and 0.015 radians with respect to the Y axis, respectively.

In operation, if the mirrors 12 and 13 are tilted by an angle 0.01875 and 0.015 radians as determined above, the laser beam resonates under optimum condition and is five folded, utilizing the active laser medium 15 five times between $Y_{A5}$ and $Y_{B3}$.

As a result high power lasers are efficiently produced in the compact cavity.

One can of course easily change the number of laser beam passes N within the resonator by changing the the ratio between $\theta_A$ and $\theta_B$ according to the equation (4) and (7).

Now, in practice, deviation from $\theta_A$ and $\theta_B$ may occur due to machining inaccuracies, mechanical distortions, thermal effects, etc. However, the results of these changes may be compensated by adjusting the tilt angle of one of the mirrors, say, the output coupler. Since such adjustment is equivalent to tilting the output beam, and hence the Z axis, a unique tilt angle will occur such that R returns to its original design value, i.e., 1.25 in the above case example.

To explain this, we suppose that $\theta_A$ and $\theta_B$ are misaligned by angles $\alpha$ and $\beta$ respectively. These change of angles $\theta_A$, $\theta_B$ are compensated, if the output coupler is tilted by angle $\gamma$ which satisfies an equation (4)

$$\frac{\theta_A + \alpha - \gamma}{\theta_B + \beta - \gamma} = R = 1.25. \tag{8}$$

Therefore, it can be shown that the output coupler must be tilted by an angle given by $$\gamma = \frac{R(\theta_B + \beta) - (\theta_A + \alpha)}{R - 1} \tag{9}$$

in order to achieve an optimum alignment of the resonator optics.

Furthermore, as is understood from the above explanation, any small deviations of tilt angles of mirrors 12, 13, 14 as well as that of tilt angles of mirrors 12, 13 are also compensated by adjusting the tilt angle of any one of the mirrors 12, 13, 14, since the optimum alignment of the resonator optics are achieved only if a equation similar to (8) is satisfied; for example if the mirrors 12, 13, 14 are tilted by angles $\alpha$, $\beta$, $\gamma$, these deviations are compensated by tilting the mirror 12 by an angle $\alpha'$ which satisfies the equation $$\frac{\theta_A + \alpha - \alpha' - \gamma}{\theta_B + \beta - \gamma} = R = 1.25 \tag{10}$$

Now as is evident from the above, the system disclosed in FIG. 2 is the optical system for the folded cavity laser in which a rear mirror is economized, and the laser beam is optimized by tilting any one of two folding mirrors or the output mirror.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. An optical system for a folded cavity laser comprising:

an active laser medium;

a partially transmitting output mirror disposed on a first side of the laser medium, a surface of the output mirror facing the laser medium and a line normal thereto defining a Z-axis of the optical system;

a single first mirror disposed on said first side of the output mirror with respect to said laser medium, said first mirror comprising a flat folding mirror, a surface of first flat folding mirror facing said laser medium and tilted about an X-axis by an angle $\theta_A$ with respect to a Y-axis, wherein the X- and Y-axes are perpendicular to the Z-axis and also to each other;

a single second mirror disposed on a second side opposite said first side of said output mirror with respect to said laser medium, said second mirror comprising a flat folding mirror, a surface of said second flat folding mirror facing said output mirror and said first flat folding mirror through said laser medium and tilted about said X-axis by an angle $\theta_B$ with respect to said Y-axis in a manner such that the angles $\theta_A$ and $\theta_B$ approximately satisfy a relation $\theta_A/\theta_B = N/N-1$ wherein N is a positive interger; and means for tilting the face of said output mirror about said X-axis so that the relation $\theta_A/\theta_B = N/N-1$ is precisely satisfied.

2. The optical system of claim 1 including means for adjusting said output mirror so that misalignments of said folding mirrors are compensated.

3. The optical system of claim 1 wherein both of said folding mirrors are fully reflecting mirrors.

4. The optical system of claim 1 wherein said active laser medium is a material selected from the group of gas, liquid, and solid laser mediums.

5. The optical system of claim 1 wherein said laser medium is a gas selected from the group $CO_2$, $N_2$, and He.

6. The optical system of claim 1 wherein said laser medium is a solid laser crystal selected from the group of YAG, GGG, Ruby, GSGG, semiconducting materials including GaAs, $Ti^{3+}$ doped fluoride crystals, and $Cr^{3+}$ doped fluoride crystals.

* * * * *